No. 794,902.

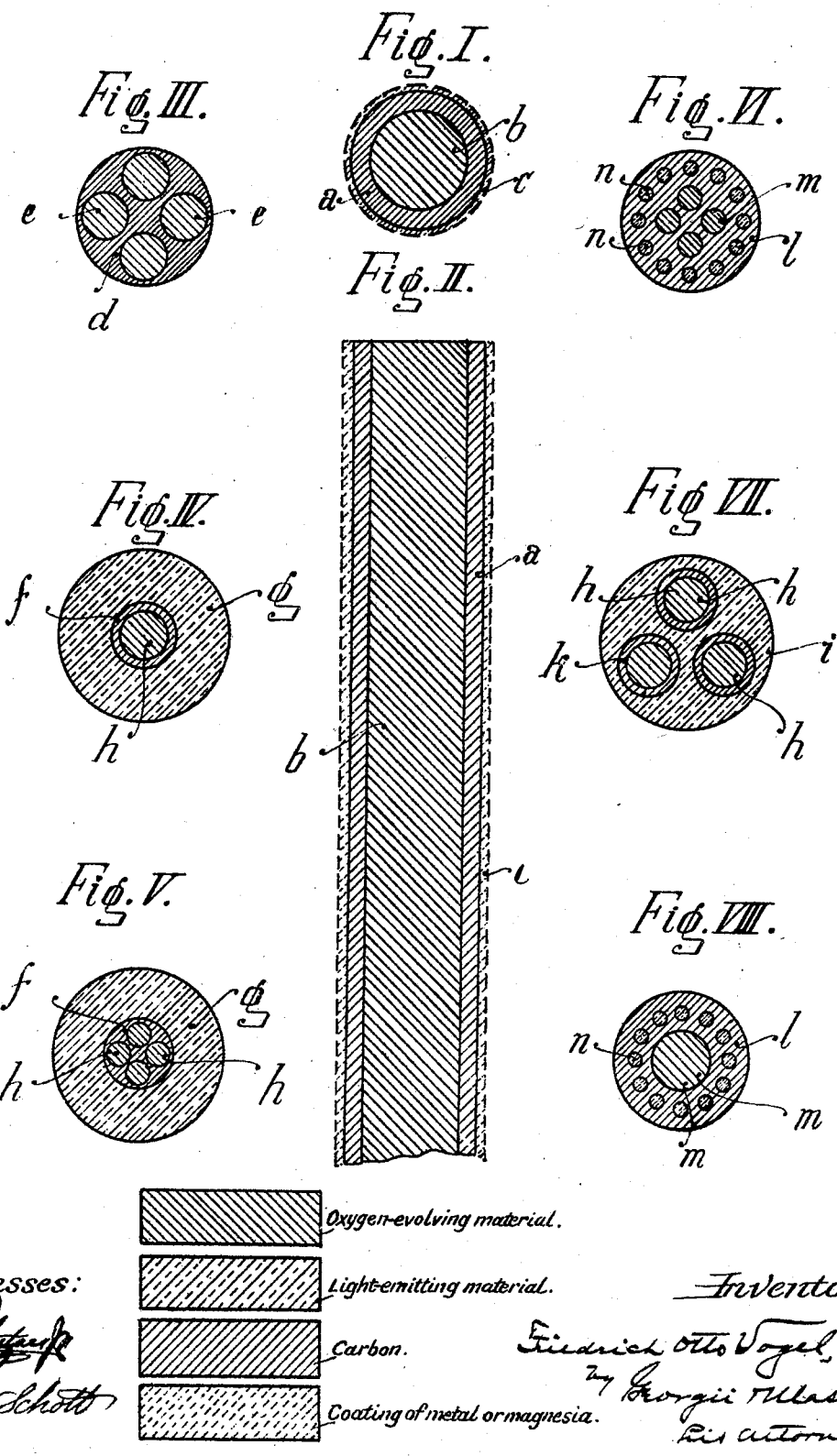

Patented July 18, 1905.

UNITED STATES PATENT OFFICE.

FRIEDRICH OTTO VOGEL, OF BERLIN, GERMANY.

ARC-LIGHT ELECTRODE.

SPECIFICATION forming part of Letters Patent No. 794,902, dated July 18, 1905.

Application filed July 6, 1903. Serial No. 164,491.

*To all whom it may concern:*

Be it known that I, FRIEDRICH OTTO VOGEL, a subject of the Emperor of Germany, residing in Berlin, in the Empire of Germany, (whose full postal address is 34¹ Augsburgerstrasse, Berlin, aforesaid,) have invented certain new and useful Improvements in and Connected with Arc-Light Electrodes, of which the following is a specification.

My invention relates to improvements in arc-light electrodes.

Scientific investigations of the chemical and physical processes taking place in the production of an electric arc between two carbon electrodes provided with light-emitting substances have shown that the vapors of the acids contained in the metal salts added to the electrodes are only a detriment to the arc at the expense of current consumption and light production, since these vapors, as well as the heavier metals themselves, are not only poor conductors of electricity, but also are poor radiators of light. On the other hand, it is established that the conductivity of the vapors of the alkali, earth alkali, and rare earth metals is very good. Of course through the vaporization of these light-emitting materials there is a loss of energy, and a further loss of energy occurs if one employs a specially large arc, as is possible on account of the good conductivity of the vapors of the metals named.

The object of the present invention now is to enrich the arc with good conducting metallic vapors—that is, to concentrate a great quantity of such vapors in the space occupied by the arc—and also to raise the temperature of the arc in order to compensate for the loss of energy arising from the two causes mentioned above. The raising of the temperature of the arc alone may be done, as the scientific experiments hereinbefore referred to have shown, by the introduction of free ozone into the arc, because the ozone causes a chemical reaction in the arc, resulting in an increase of the temperature of the said arc.

Both advantages—namely, the enrichment of the arc with metallic vapors as well as the increase in the temperature of the arc at the same time—are obtained by the employment of the electrodes which form the subject-matter of the present invention.

My invention will now be more particularly explained in connection with some preferred embodiments illustrated in the drawings, in which—

Figure 1 is a horizontal section, and Fig. 2 a cross-section, of one form of electrode embodying my invention. Figs. 3, 4, 5, 6, 7, and 8 are cross-sections of still further modifications of the invention.

The novelty of these electrodes consists in the fact that they have one or more longitudinal channels in which are contained chemical substances separated from the light-emitting materials by the carbon walls of the electrodes, which chemical substances give off free oxygen under the heating action of the electric current and the incandescent electrodes, said free oxygen being ozonized by the action of the electric current before it mixes with the vapors of the light-emitting substances. It is already old and well known to add chemicals which give off oxygen—for example, saltpeter, chlorate of potash, and the like—to a mixture of light-emitting substances or their melted compounds—as, for example, for the production of silico-carbon and for the manufacture of impregnated electrodes. This is done, for example, in producing a deposit of silicon upon the carbon prior to the production of the electrodes. In other cases electrodes which are completely formed are soaked in the said melted compounds.

The present new arrangement of employing the substances which give off oxygen, so that they are separate from the light-emitting material, has not been done hitherto, because the action of free ozone in the arc has been only recently discovered.

The simplest form of the new electrode is shown in Figs. 1 and 2 of the accompanying drawings. This electrode consists of a thin tube $a$, which is made from carbon, to which has been added the light-emitting materials, and is filled with a separate mass $b$, which contains any kind of substance which will give off oxygen. The carbon mantle $a$ of this new electrode may be covered in a known manner with a metallic coating or with a layer $c$ of magnesia, as shown by the dotted lines.

Fig. 3 illustrates a cross-section through a second modified form of an electrode embodying my invention, comprising a body $d$, made from carbon with the addition of light-emitting substance and having a plurality of longitudinal channels $e$.

The electrodes shown in Figs. 4 and 5 have cores $f$, of pure carbon, and an envelop $g$, of light-emitting material.

In the electrode shown in Fig. 4 the core $f$ is provided with one channel—that is to say, is tubular—while in the construction shown in Fig. 5 a plurality of such channels are provided, these channels in each form being filled with a suitable oxygen-evolving substance, as indicated at $h'$.

In Fig. 7 is shown an analogous modification in which several tubes $k\ k$, of pure carbon, are inserted in a body $i$ of light-emitting material, the carbon tubes inclosing a substance $h$ which will give off oxygen.

Experience has taught that with electrodes such as shown in Figs. 4, 5, and 7 the best results are obtained when the cross-sectional area of the substance which gives off oxygen is equal to from one-half to six-tenths of the total cross-sectional area of the carbon.

The modifications shown in Figs. 6 and 8 comprise a body $l$, of pure carbon, provided with one or more inner longitudinal channels $m$ to receive the substance which gives off oxygen and also provided with a series of outer longitudinal channels $n$ for the reception of the light-emitting material.

Since the carbon itself is vaporized in the arc, the arrangement shown in Figs. 1 and 3 may be effectively employed by using the pure carbon without any light-emitting substance—that is to say, the mantle $a$ or body $d$ can be formed of pure carbon, while the longitudinal channel $b$, Fig. 1, (instead of being filled with light-emitting substance, as has been common heretofore,) or the channels $e$, Fig. 3, are filled with a substance which will give off oxygen.

The light-emitting substances are generally well known. As a material for giving off oxygen the superoxids are especially suitable for the purposes aimed at, and of these superoxids the most valuable are those which color the flame—as, for example, the superoxids of natrium, calcium, or barium.

The chemical conversion and dissociation processes in arcs, which are introduced by the action of the ozone upon the alkali and carbon vapors, are associated with a significant production of heat. The result of this is a very intense movement of the ions and a uniform high temperature in the arc. There results, therefore, a very intense vaporization of the carbon and of the substances mixed with it—as, for example, lime, aluminium, barium oxid, the carbonates of potassium, and strontium and the like. In this way the arc is enriched with the gases or vapors of the light-emitting substances—that is, in the space occupied by the arc a great quantity of such gases or vapors are concentrated. This brings about an increase in the conductivity of the arc and in the radiation of light, which is carried to a still greater extent because the electrode-points become still more incandescent.

Having thus fully described my invention, what I claim as new, and desire to secure by Letters Patent, is—

1. An arc-light electrode provided with means for supplying ozone to the arc.

2. An arc-light electrode having a body of material located to deliver ozone to the arc.

3. An arc-light electrode containing carbon and a separately-located body of oxygen-evolving material, the cross-sectional area of the oxygen-evolving material being at least one-half the area of the carbon.

4. An arc-light electrode having a channel containing material capable of evolving free oxygen, only, when subjected to heat.

5. An arc-light electrode having a body containing carbon, said body being provided with a channel in which is located a material capable of evolving free oxygen, only, when subjected to heat.

6. An arc-light electrode having a body containing carbon and a light-emitting substance, said body being provided with a channel in which is located a material capable of evolving free oxygen, only, when subjected to heat.

7. An arc-light electrode containing material which when heated will supply vapors of good conductivity to the arc, and having, also, a separately-located body of material capable of evolving free oxygen, only, when heated.

8. An arc-light electrode containing carbon and provided with a separately-located body of material capable of evolving free oxygen, only, and of coloring the arc.

9. An arc-light electrode containing carbon and light-emitting material and provided with a separately-located body of material capable of evolving free oxygen, only, and of coloring the arc.

10. An arc-light electrode containing carbon and provided with a separately-located body of superoxid.

11. An arc-light electrode containing carbon and a light-emitting material and provided with a separately-arranged body of superoxid.

12. In an electrode for arc-lamps, the combination, of a carbon rod and of a superoxid developing ozone when burning, said superoxid being located in a longitudinal channel within said carbon rod.

13. In an electrode for arc-lamps, the combination, of a carbon rod and of a superoxid developing ozone when burning, said superoxid being located in a plurality of longitudinal channels within said carbon rod.

14. In an electrode for arc-lamps, the combination, of a carbon rod impregnated with a light-producing material and of a superoxid developing ozone when burning, said superoxid being located in a longitudinal channel within said carbon rod.

15. In an electrode for arc-lamps, the combination, of a carbon rod impregnated with a light-producing material and of a superoxid developing ozone when burning, said superoxid being located in a plurality of longitudinal channels within said carbon rod.

16. In an electrode for arc-lamps, the combination, of a carbon rod, of a superoxid developing ozone when burning, said superoxid being located in a longitudinal channel within said carbon rod and a coating of light-producing material.

17. In an electrode for arc-lamps, the combination, of a carbon rod, of a superoxid developing ozone when burning, said superoxid being located in a plurality of longitudinal channels within said carbon rod and a coating of light-producing material.

18. In an electrode for arc-lamps, the combination, of a rod of light-producing material, of a superoxid developing ozone when burning, said superoxid being located in a longitudinal channel within said rod and of carbon rods located in further longitudinal channels.

19. In an electrode for arc-lamps, the combination, of a rod of light-producing material, of a superoxid developing ozone when burning, said superoxid being located in a plurality of longitudinal channels within said rod and of carbon rods located in further longitudinal channels.

20. In an electrode for arc-lamps, the combination, of a plurality of carbon rods each containing in a longitudinal channel a superoxid developing ozone when burning, and a coating of light-producing material.

21. An electrode for arc-lamps containing, in a longitudinal channel, a superoxid developing ozone when burning, the cross-sectional area of the superoxid being at least one-half of the total cross-sectional area of the electrode.

22. An electrode for arc-lamps containing, in a plurality of longitudinal channels, a superoxid developing ozone when burning, the cross-sectional area of the superoxid being at least one-half of the total cross-sectional area of the electrode.

In witness whereof I have hereunto set my hand in presence of two witnesses.

FRIEDRICH OTTO VOGEL.

Witnesses:
  WOLDEMAR HAUPT,
  HENRY HASPER.